United States Patent
Shim et al.

(10) Patent No.: US 6,973,214 B1
(45) Date of Patent: Dec. 6, 2005

(54) INK DISPLAY FOR MULTI-STROKE HAND ENTERED CHARACTERS

(75) Inventors: Jae H. Shim, San Jose, CA (US); Pang C. Chen, Palo Alto, CA (US)

(73) Assignee: Mobigence, Inc., San Jose, CA (US)

( * ) Notice: Subject to any disclaimer, the term of this patent is extended or adjusted under 35 U.S.C. 154(b) by 664 days.

(21) Appl. No.: 09/919,071

(22) Filed: Jul. 30, 2001

(51) Int. Cl.[7] .............................................. G06K 9/00

(52) U.S. Cl. ..................... 382/186; 382/187; 345/179; 178/18.03

(58) Field of Search ................................ 382/187–189, 382/309, 311; 345/179; 178/18.01, 18.03, 178/20.01

(56) References Cited

U.S. PATENT DOCUMENTS

| | | | | |
|---|---|---|---|---|
| 5,313,527 A | * | 5/1994 | Guberman et al. | 382/186 |
| 5,335,289 A | * | 8/1994 | Abdelazim | 382/177 |
| 5,613,019 A | * | 3/1997 | Altman et al. | 382/311 |
| 6,340,967 B1 | * | 1/2002 | Maxted | 345/179 |
| 6,493,464 B1 | * | 12/2002 | Hawkins et al. | 382/189 |

OTHER PUBLICATIONS

Hebert et al. "Cursive Character Detection Using Incremental Learning." Proc. 5th Int. Conf. on Document Analysis and Recognition, Sep. 20, 1999, pp. 808-811.*

* cited by examiner

*Primary Examiner*—Amelia M. Au
*Assistant Examiner*—Charles Kim

(57) ABSTRACT

System and method for display of ink representing a sequence of one or more handwirtten and hand printed ("hand entered") alphanumeric characters on a portion of a touch screen that receives and displays hand entered characters. When a character (or word) is hand entered using a stylus with a single stroke, ink for the corresponding character is optionally displayed for a first time interval before conversion and re-display of the character as standard text. When a multi-stroke character (or word), such as "t" or "x" or "4", is hand entered, a time interval for display of the hand entered version is extended so that the user can supply the additional strokes needed to complete the character, before the character is converted and re-displayed as standard text. Hand printed characters and cursive characters are processed in a similar manner. Overwriting an earlier-entered character with a later (unrelated) character causes the earlier-entered character to be promptly removed from the screen.

28 Claims, 4 Drawing Sheets

X versus \ / versus l 1

FIG. 1A

| | |
|---|---|
| lill | *lill* |
| lilt | *lilt* |
| till | *till* |
| tilt | *tilt* |
| title | *title* |
| little | *little* |

FIG. 1B

*ii* versus *u*

FIG. 1C

*ill* versus *ui* versus *ul*

INK DISPLAY FOR MULTI-STROKE HAND ENTERED CHARACTERS

FIELD OF THE INVENTION

This invention relates to display of ink representing handwritten and hand printed ("hand entered") characters on a screen.

BACKGROUND OF THE INVENTION

Conventional hand held computing devices (wireless or otherwise), such as personal digital assistants ("PDAs") and certain radiotelephones known as "smart phones" (collectively referred to herein as "hand held devices"), provide a touch sensitive screen overlaid on a liquid crystal display ("LCD") screen (collectively referred to herein as a "display module"). Many hand held devices provide built-in handwriting or character recognition technology as a user input tool to analyze and recognize handwritten characters.

Some hand held devices, with character recognition technology incorporated, display ink representing a handwritten character on the LCD screen as the character is entered on the touch screen. These hand held devices with character recognition and ink display capability are able to recognize only one character at a time. The LCD screen begins to display the ink as stylus pressure is applied on the touch screen ("pen-down") and continues this ink display while the stylus is pressed upon, and moved across, the screen, until stylus pressure is removed from the touch screen ("pen-up"); the ink display is then immediately removed from the screen. This method of conventional ink display and removal is adequate for a character that can be formed with a single stroke, defined by one pen-down followed by one pen-up. Examples of such characters are "a", "e", "m" and "s." However, for a multi-stroke character, such as "i", "k", "t" and "x", that consists of a first stroke followed by one or more additional ("modifier") strokes, ink for the first stroke is already removed from the LCD screen before ink for the modifier stroke is completely entered. Thus, ink for the corresponding character is never completely displayed on the screen. This results in less accurate recognition, unless the modifier stroke is entered in a correct position relative to the first stroke for that character. This approach is also inconvenient and less user-friendly. A modifier stroke (1) must be entered in a correct position relative to the corresponding first stroke and (2) must be entered within the fixed time interval relative to entry of the first stroke.

Some hand held devices with handwriting recognition (instead of character recognition) and ink display capability are able to recognize one or more characters at a time, and ink is displayed on the screen for a fixed duration time interval (usually 0.6–1.2 sec), regardless of the number of characters and regardless of the number of strokes required for a given character, before ink is removed from the screen. This method of conventional ink display and removal is also inadequate and inconvenient, because it provides excessive time for entry and display of ink for a single stroke character, or it provides inadequate time for completely entering and displaying ink for a multiple stroke character, depending on the length of the fixed duration time interval. This can cause inaccurate character recognition and/or cause unnecessary time delay in entry of a sequence of handwritten characters.

What is needed is a system that maintains the ink representing one or more strokes of a multi-stroke single character, or of a "continuous cursive word" (containing a handwritten sequence of two or more cursive characters joined together), for a time interval adequate to allow completion and display of the full character or character sequence before the ink is removed. Preferably, the system should be able to recognize and provide special treatment for a character that is potentially a multi-stroke character so that characters not in this group can be accepted and displayed conventionally. Preferably, the system should allow a user to enter one or more additional characters that, because of the user's unique method of formation of such characters, are to be treated as potentially multi-stroke characters. Preferably, the system should recognize and deal appropriately with an overwritten character that is not a modifier stroke for a previously entered character.

SUMMARY OF THE INVENTION

These needs are met by the invention, which provides a system that analyzes and assigns each hand entered character entered by a user to one of three substantially mutually exclusive character groups: (1) characters that are potentially multi-stroke; (2) user-specified characters that are to be treated as potentially multi-stroke; and (3) all other (single stroke) characters. Groups (1) and (2) are referred to together as "potentially multi-stroke" characters. Any suitable handwriting and character recognition technology can be used to analyze and recognize a character and to assign the recognized character to one of the three character groups.

In one embodiment, display of ink representing a single character or a continuous cursive word belonging to group 3 is continued after pen-up for a first stroke time interval of a selected first length, which may be as small as 0 sec; and display of ink representing a character sequence belonging to group 1 or group 2 is continued after pen-up for a (longer) second or multi-stroke time interval with a selected positive second length. The second or multi-stroke time interval begins when pen-up occurs (1) after entry of a first stroke for a potentially multi-stroke hand written single character or (2) after entry of a continuous cursive word that includes a potentially multi-stroke character.

If no modifier stoke is applied to the group 1 or 2 character sequence within the second or multi-stroke time interval, display of ink representing this character sequence is removed. If a modifier stroke is applied to the group 1 or 2 character sequence within the second time interval, ink display of this character sequence, including the added second or subsequent modifier stroke, continues until final pen-up occurs and no further modifier stroke(s) is added to this character sequence. A modifier stroke is analyzed to determine if this stroke belongs to a set of proper modifier strokes for a previously entered character. If the stroke is a proper modifier stroke, the preceding procedure is applied. If the stroke is not a proper modifier stroke, the system treats the stroke as an overwritten character and removes ink displaying the previously entered characters that were present when pen-up occurred.

Keeping the ink of a multi-stroke character displayed until character sequence formation is completed increases the accuracy in recognition of a fully formed character sequence, by displaying ink representing the portion of the character(s) formed thus far as a guide for correct positioning of the subsequent strokes and/or characters.

BRIEF DESCRIPTION OF THE DRAWINGS

FIGS. 1A, 1B, 1C and 1D illustrate some ambiguities in recognition of a potentially multi-stroke character or group of joined characters.

DESCRIPTION OF BEST MODES OF THE INVENTION

Figure 2:
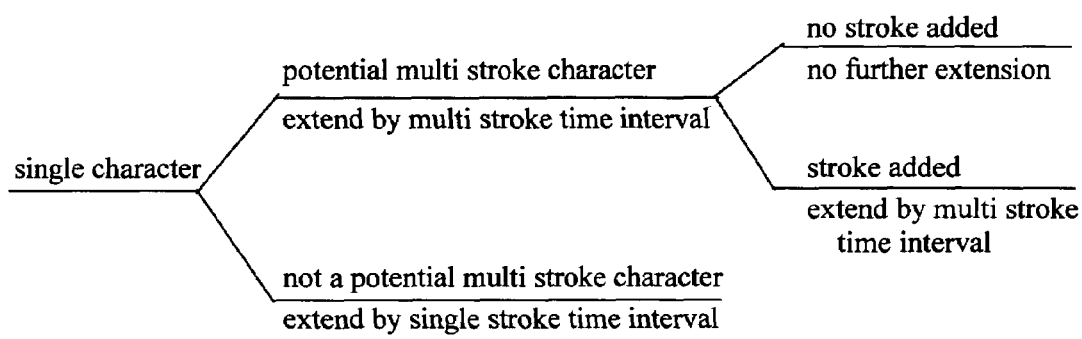
FIGS. 2 and 3 illustrate procedures for displaying ink representing a single character and a continuous cursive word, respectively, according to the invention.

The system analyzes and assigns each hand entered character entered by a user to one of three mutually exclusive character groups: (1) characters that are potentially multi-stroke; (2) user-specified characters that are to be treated as potentially multi-stroke; and (3) all other (single stroke) characters. Groups (1) and (2) are collectively referred to herein as "potentially multi-stroke" characters.

Consider a hand held device having a display module (touch sensitive screen plus an LCD screen for display) that accepts, analyzes, recognizes and temporarily displays ink for a hand printed alphanumeric character or continuous cursive word of such characters (referred to collectively as a "character sequence" herein). To avoid additional ambiguities, interest focuses on lower case alphanumeric and punctuation characters. The following (lower case) characters, part of group 1, are potentially formed using two or more strokes:

"f", "g", "i", "j", "k", "t", "x", "y", "4", "8", ";", ":", "?", "!", "*", "#".

The following characters, part of group 3, are formed with a single stroke by most users:

"a", "b", "c", "d", "e", "h", "l", "m", "n", "o", "p", "r", "s", "u", "v", "w", "z", "1", "2", "3", "5", "6", "7", "9", ".", ",", "/", "\", "&".

Some of the characters from group 3 may be re-assigned to a user-specified group 2 because of the manner in which a particular user forms these characters; these group 2 characters may include, but are not necessarily limited to:

"b", "d", "h", "p", "q", "2", "3", "5".

An example of a group 1 character is the letter "x", which consists of a backward slash (\) intersected by a forward slash (/). If the second of these two slashes (e.g., a back slash) is not entered during the fixed time interval after ink representing the first slash is entered, or if the second slash is incorrectly positioned relative to (does not intersect) the first slash, the letter "x" may become displayed in standard text as two separated slashes or vertical lines, for example as "\ /" or as "1 1", as illustrated in FIG. 1A.

A modifier stroke on another potentially multi-stroke character (group (1) or group (2)) is "correctly positioned" if (1) the modifier stroke intersects at least one stroke included in the remainder of the character (e.g., "t" or "k") or (2) the modifier stroke is a short stroke or "dot" (an "i" or "j") that is approximately aligned with, and above or below, the remainder of the character; otherwise, the modifier stroke is incorrectly positioned or absent. An incorrectly positioned modifier stroke may be ignored by the system or may be treated as a stroke belonging to another character, as demonstrated in the preceding discussion of "x."

Recognition of one or more potentially multi-stroke characters within a continuous cursive word is often more difficult, if ink for characters corresponding to a first stroke is removed before the modifier stroke is entered. Consider the cursive word that is initially formed as "lill" and illustrated in continuous cursive format and hand printed format in FIG. 1B. The intended word, when completed, may be any of the following, among others:

"lill", "lilt", "till", "tilt", "title", "little".

Each character of a continuous cursive word is analyzed to determine whether the character potentially belongs to group 1 (e.g., a letter "l" that can be subsequently converted to a letter "t"), to group 2 or to the remainder, in group 3. The combined group 1 and group 2 characters include all potentially multi-stroke characters for that user. Early removal of ink for a first character stroke can cause incorrect recognition of the corresponding character, or (mis)recognition of an unintended character or word, depending upon position of the modifier stroke. This is demonstrated in FIG. 1B.

Another type of ambiguity occurs in cursive writing where two successive, joined vertical strokes occur, as illustrated in FIG. 1C, or where three successive, joined vertical strokes occur, as illustrated in FIG. 1D. Where two such strokes are joined, the intended combination may be either "i i" or the single letter "u" in cursive format. Where three such strokes are joined, the intended combination may be "i u" or "u i" or "w" in cursive format. These are examples of the special recognition problems that are presented in recognition and display of ink for continuous cursive characters and for hand printed characters.

According to the invention, each character sequence is analyzed as entered by a stylus on the screen to determine if the character is a single character (indicative of hand printing) or is part of a continuous cursive word. If the character sequence is a single character, only that character need be analyzed to assign it to group 1 or 2 or 3. If the single character belongs to group 3, display of ink representing the character is extended for a first or single stroke time interval having a first selected length (e.g., 0–2 sec), after pen-up at the end of the character, and the displayed ink is then removed. If the first selected length is 0 sec, ink display is terminated as soon as stylus pressure on the screen is removed.

If the (single) character is hand printed and is a potentially multi-stroke character belonging to group 1 or 2, display of ink representing the character is extended for a second or multi-stroke time interval having a selected second length (e.g., 0–2 sec) after pen-up, to allow entry of one or more modifier strokes for the character. If stylus pressure is (re)applied (pen-down) to the screen in a correct position relative to the present character during the multi-stroke time interval, display of ink representing the (incomplete) character is preferably extended for another multi-stroke time interval having a selected length, after pen-up occurs. Two or more modifier strokes might by used, for example, in entry of the character "k" or "*" or "#", which requires two or three or four strokes to complete the character. If stylus pressure is not (re)applied to the screen in a correct position relative to the present character stroke(s) during the multi-stroke time interval, display of the ink is removed at the end of the multi-stroke time interval. This procedure is illustrated in a time line in FIG. 2. Two decisions are made here: (1) is the single character a potential multi-stroke character (belonging to group 1 or group 2); and (2) if the character is potentially multi-stroke, is one or more modifier strokes added within the multi-stroke time interval.

Figure 3:
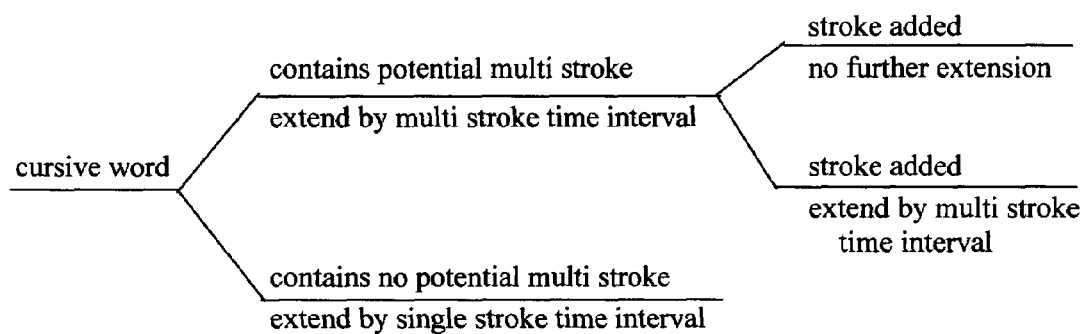

If the character is part of a continuous cursive word, two decisions, illustrated in a time line in FIG. 3, are made that are similar to the two decisions made in the time line in FIG. 2. Ink for the entire word is displayed after pen-up for the single stroke time interval, if no potentially multi-stroke character is present in the word. If at least one character in the continuous cursive word is potentially a multi-stroke character, display of ink representing the word is extended for a multi-stroke time interval after pen-up, to allow entry of one or more modifier strokes to one or more characters in the word. If stylus pressure is (re)applied (pen-down) to the screen in a correct position relative to the cursive word during the multi-stroke time interval, display of ink representing the word is optionally (and preferably) extended for another multi-stroke time interval after pen-up occurs following addition of the preceding modifier stroke. If stylus pressure is not (re)applied to the screen in a correct position relative to the continuous cursive word during the multi-stroke time interval, display of the ink representing the continuous cursive word is removed at the end of this multi-stroke time interval.

Optionally, the system also analyzes each modifier stroke, with reference to the immediately preceding hand printed character or immediately preceding continuous cursive word, to determine if this modifier stroke belongs to a "proper set" of modifier strokes that is associated with the preceding hand printed character or with at least one character in the preceding continuous cursive word. If the modifier stroke belongs to this proper set of modifier strokes, the preceding procedure is applied.

If the modifier stroke is not a member of this proper set, the system treats this modifier stroke as an overwrite of a new character that is not a part of the preceding hand entered character or continuous cursive word. In this instance, ink for display of the preceding hand printed character or continuous cursive word is optionally removed after pen-up, either immediately or after completion of an overwrite display time interval having a selected length $\Delta t3$ (e.g., 0.01–1 sec), and ink for the new (overwritten) stroke or character is being displayed.

Figure 4A:
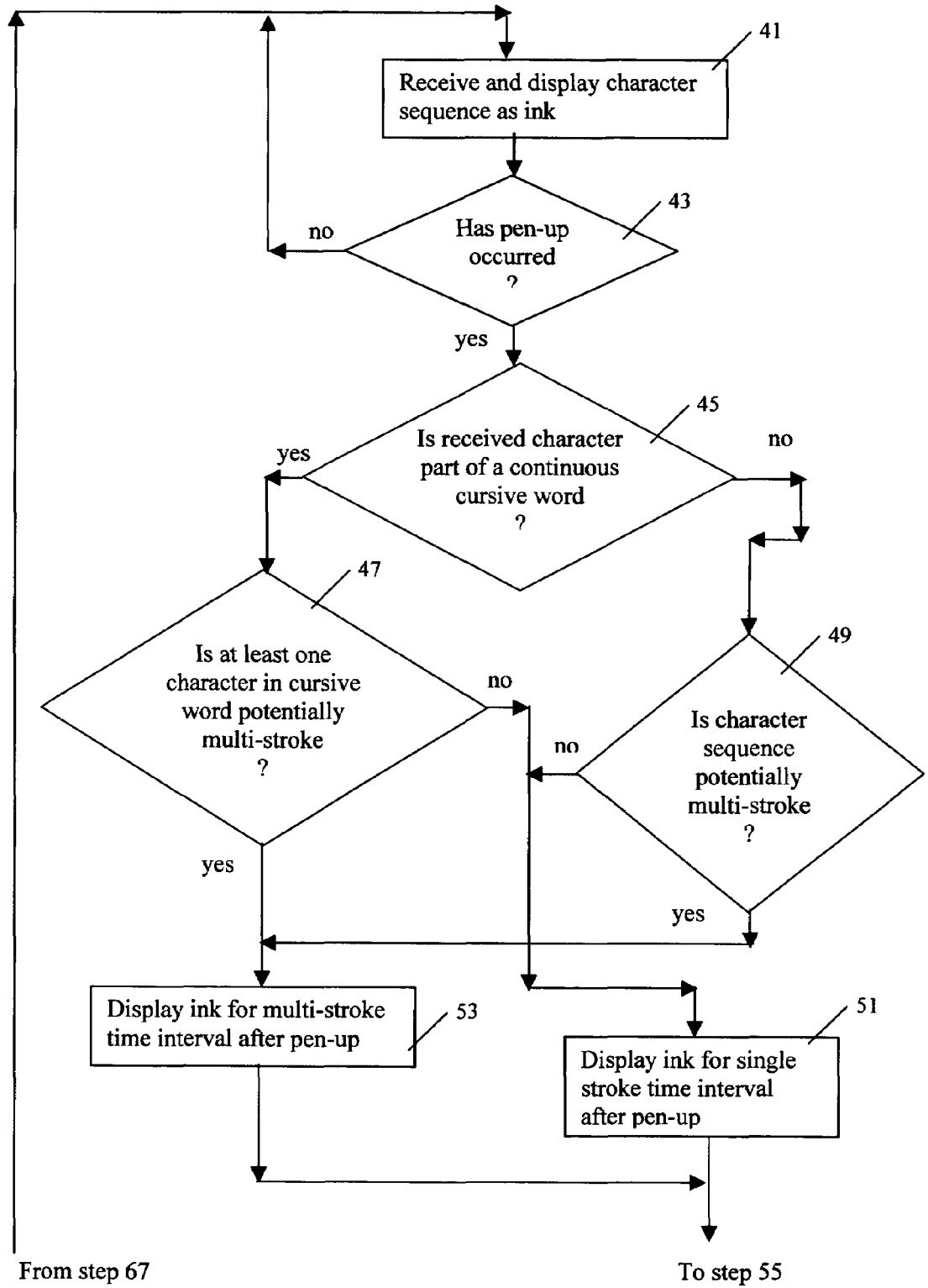
FIGS. 4A and 4B are a flow chart of a procedure for practicing the invention.
Figure 4B:
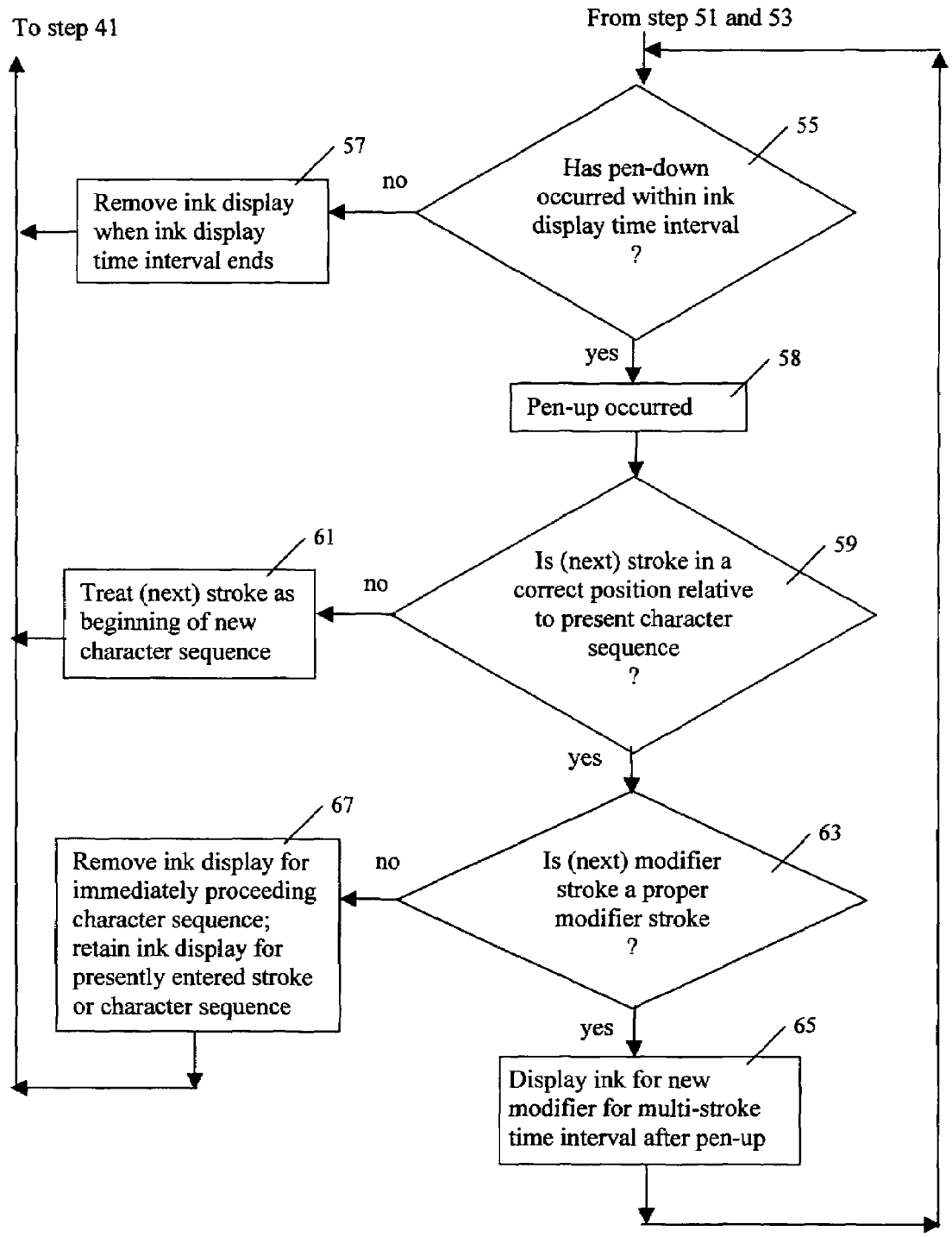

FIGS. 4A and 4B are a flow chart illustrating a procedure for practicing the invention. In step 41, a hand entered sequence of one or more alphanumeric characters is received and displayed as ink by the system. In step 43, the system determines if pen-up has occurred. If the answer to the query in step 43 is "no," the system returns to step 41 and displays ink representing the cursive word as the stylus defines or traces the remainder of the word on the touch screen. If the answer to the query in step 43 is "yes," the system determines if the received character is part of a continuous cursive word, in step 45. If the answer to the query in step 45 is "yes", the system determines, in step 47, if at least one of the characters in the cursive word is potentially multi-stroke.

If the answer to the query in step 45 is "no," the system determines, in step 49, if the character sequence (here, a single hand printed character) is potentially multi-stroke.

If the answer to the query in step 47 is "no," the system displays the ink representing the character sequence (continuous cursive word) for a first or single stroke time interval, following pen-up at the end of the character sequence, in step 51, and moves to step 55. If the answer to the query in step 47 is "yes," the system displays the ink representing the character sequence (continuous cursive word) for a second or multi-stroke time interval, following pen-up, in step 53, and moves to step 55.

If the answer to the query in step 49 is "no," the system displays the ink representing the character sequence (hand printed character) for the single stroke time interval, following pen-up at the end of the character sequence, in step 51, and moves to step 55. If the answer to the query in step 49 is "yes," the system displays the ink representing the character sequence (hand printed character) for the multi-stroke time interval, following pen-up, in step 53, and moves to step 55.

In step 55, the system determines if pen-down has re-occurred during the ink display time interval (single stroke or multi-stroke). If the answer to the query in step 55 is "no," the system removes display of ink representing the cursive word (or hand printed character) after completion of the ink display time interval, in step 57, and optionally returns to step 41. If the answer to the query in step 55 is "yes," the system waits for pen-up, in step 58, and determines if the (next) modifier stroke is in a correct position relative to the present character sequence, in step 59.

If the answer to the query in step 59 is "no," the system treats the (next) modifier stroke as the beginning of a new character sequence, in step 61, and optionally returns to step 41.

If the answer to the query in step 59 is "yes," the system determines if the (next) modifier stroke is a proper modifier stroke, in step 63. If the answer to the query in step 63 is "yes," the system displays ink for the (next) modifier stroke for a multi-stroke time interval, after pen-up occurs, in step 65, and returns to step 55. Renewal of the multi-stroke time interval will occur as often as needed to allow entry of one or more modifier strokes for the character sequence.

If the answer to the query in step 63 is "no," a character overwrite is present. The system, in step 67, removes ink display of the immediately preceding character sequence (after completion of the overwrite display time interval, if any), retains ink display for the presently entered overwrite stroke or character sequence, and returns to step 41.

What is claimed is:

1. A method for display of ink representing handwritten and hand printed characters on a display screen, the method comprising:

receiving a sequence of one or more characters, entered by a user using a stylus to trace the sequence on a screen;

determining if the sequence of one or more characters is part of a continuous cursive word;

when the sequence of one or more characters is part of a continuous cursive word, determining if at least one character in the cursive word is a potential multi-stroke character;

when no character in the cursive word is a potential multi-stroke character, displaying ink representing the cursive word until the stylus is lifted from the screen and for a selected single stroke time interval after the stylus is lifted from the screen;

when at least one character in the cursive word is a potential multi-stroke character, displaying ink representing the cursive word until the stylus is lifted from the screen and for a selected multi-stroke time interval after the stylus is lifted from the screen; and when the stylus is reapplied to the screen in a correct position relative to at least one character in the cursive word during the multi-stroke time interval, receiving at least one stroke from the stylus and continuing to display the cursive word and the at least one received stroke until the reapplied stylus is lifted from the screen and for a multi-stroke time interval after the reapplied stylus is lifted from the screen.

2. The method of claim 1, further comprising:

when said sequence of one or more characters is not part of a continuous cursive word, determining if at least one character in said character sequence is a potential multi-stroke character;

when no character in said character sequence is a potential multi-stroke character, displaying ink representing the one or more characters in said character sequence until said stylus is lifted from said screen and for said single stroke time interval after said stylus is lifted from said screen;

when at least one character in said character sequence is a potential multi-stroke character, displaying ink representing the one or more characters in said character sequence until said stylus is lifted from said screen and for said multi-stroke time interval after said stylus is lifted from said screen; and when said stylus is reapplied to said screen in a correct position relative to at least one character in said character sequence during said multi-stroke time interval, receiving at least one stroke from said stylus and displaying the one or more characters in said character sequence and the at least one received stroke until said reapplied stylus is lifted from said screen and for said multi-stroke time interval after said reapplied stylus is lifted from said screen.

3. The method of claim 1, further comprising:

when said stylus is not reapplied to said screen in a correct position relative to at least one character in said cursive word during said multi-stroke time interval, continuing to display ink representing said cursive word until said stylus is lifted from said screen and for said single stroke time interval after said stylus is lifted from said screen.

4. The method of claim 1, further comprising choosing said single stroke time interval length in a range 0–2 sec.

5. The method of claim 1, further comprising choosing said multi-stroke time interval length in a range 0–2 sec.

6. The method of claim 1, further comprising choosing said potential multi-stroke characters to include at least one character from a character set consisting of "b", "d", "f", "g", "h", "i", "j", "k", "p", "q", "t", "x", "y", "2", "3", "4", "5", "8", ";", ":", "?", "!", "*", and ".".

7. A method for display of ink representing handwritten and hand printed characters on a display screen, the method comprising:

receiving a sequence of one or more characters, entered by a user using a stylus to trace the sequence on a screen;

determining if the sequence of one or more characters is part of a continuous cursive word;

when the sequence of one or more characters is part of a continuous cursive word, determining if at least one character in the cursive word is a potential multi-stroke character;

when no character in the cursive word is a potential multi-stroke character, displaying ink representing the cursive word until the stylus is lifted from the screen and for a selected single stroke time interval after the stylus is lifted from the screen;

when at least one character in the cursive word is a potential multi-stroke character, displaying ink representing the cursive word until the stylus is lifted from the screen and for a selected multi-stroke time interval after the stylus is lifted from the screen;

when the stylus is reapplied to the screen in a correct position relative to at least one character in the cursive word during the multi-stroke time interval, receiving at least one stroke from the stylus and determining if the received stroke is a proper modifier stroke;

when the received stroke is a proper modifier stroke, continuing to display the cursive word and the at least one received stroke until the reapplied stylus is lifted from the screen and for a multi-stroke time interval after the reapplied stylus is lifted from the screen; and when the received stroke is not a proper modified stroke, removing ink representing the character sequence from the screen and continuing to display the received stroke for at least the single stroke time interval after the reapplied stylus is lifted from the screen.

8. The method of claim 7, further comprising:

when said sequence of one or more characters is not part of a continuous cursive word, determining if at least one character in said character sequence is a potential multi-stroke character;

when no character in said character sequence is a potential multi-stroke character, displaying ink representing the one or more characters in said character sequence until said stylus is lifted from said screen and for said single stroke time interval after said stylus is lifted from said screen;

when at least one character in said character sequence is a potential multi-stroke character, displaying ink representing the one or more characters in said character sequence until said stylus is lifted from said screen and for said multi-stroke time interval after said stylus is lifted from said screen; and when said stylus is reapplied to said screen in a correct position relative to at least one character in said character sequence during said multi-stroke time interval, receiving at least one stroke from said stylus and continuing to display the one or more characters in said character sequence and the at least one received stroke until said reapplied stylus is lifted from said screen and for said multi-stroke time interval after said reapplied stylus is lifted from said screen.

9. The method of claim 7, further comprising:

when said stylus is not reapplied to said screen in a correct position relative to at least one character in said cursive word during said multi-stroke time interval, continuing to display ink representing said cursive word until said stylus is lifted from said screen and for said single stroke time interval after said stylus is lifted from said screen.

10. The method of claim 7, further comprising choosing said single stroke time interval length in a range 0–2 sec.

11. The method of claim 7, further comprising choosing said multi-stroke time interval length in a range 0–2 sec.

12. The method of claim 7, further comprising choosing said potential multi-stroke characters to include at least one character from a character set consisting of "b", "d", "f", "g", "h", "i", "j", "k", "p", "q", "t", "x", "y", "2", "3", "4", "5", "8", ";", ":", "?", "!", "*", and "#".

13. A system for display of ink representing handwritten and hand printed characters on a display screen, the system comprising:

a screen that receives a sequence of one or more characters, entered by a user using a stylus to trace the sequence on the screen; and a computer that is programmed:

to determine if the sequence of one or more characters is part of a continuous cursive word;

when the sequence of one or more characters is part of a continuous cursive word, to determine if at least one character in the cursive word is a potential multi-stroke character;

when no character in the cursive word is a potential multi-stroke character, to display ink representing the cursive word until the stylus is lifted from the screen and for a selected single stroke time interval after the stylus is lifted from the screen;

when at least one character in the cursive word is a potential multi-stroke character, to display ink representing the cursive word until the stylus is lifted from the screen and for a selected multi-stroke time interval after the stylus is lifted from the screen; and when the stylus is reapplied to the screen in a correct position relative to at least one character in the cursive word during the multi-stroke time interval, to receive at least one stroke from the stylus and to continue to display the cursive word and the at least one received stroke until the reapplied stylus is lifted from the screen and for a multi-stroke time interval after the reapplied stylus is lifted from the screen.

14. The system of claim 13, wherein said computer is further programmed so that:

when said sequence of one or more characters is not part of a continuous cursive word, to determine if at least one character in said character sequence is a potential multi-stroke character;

when no character in said character sequence is a potential multi-stroke character, to display ink representing the one or more characters in said character sequence until said stylus is lifted from said screen and for said single stroke time interval after said stylus is lifted from said screen;

when at least one character in said character sequence is a potential multi-stroke character, to display ink representing the one or more characters in said character sequence until said stylus is lifted from said screen and for said multi-stroke time interval after said stylus is lifted from said screen; and when said stylus is reapplied to said screen in a correct position relative to at least one character in said character sequence during said multi-stroke time interval, to receive at least one stroke from said stylus and to display the one or more characters in said character sequence and the at least one received stroke until said reapplied stylus is lifted from said screen and for said multi-stroke time interval after said reapplied stylus is lifted from said screen.

15. The system of claim 13, wherein said computer is further programmed so that:

when said stylus is not reapplied to said screen in a correct position relative to at least one character in said cursive word during said multi-stroke time interval, to continue to display ink representing said cursive word until said stylus is lifted from said screen and for said single stroke time interval after said stylus is lifted from said screen.

16. The system of claim 13, wherein said computer is further programmed to choose said single stroke time interval length in a range 0–2 sec.

17. The system of claim 13, wherein said computer is further programmed to choose said multi-stroke time interval length in a range 0–2 sec.

18. The system of claim 13, wherein said computer is further programmed to choose said potential multi-stroke characters to include at least one character from a character set consisting of "b", "d", "f", "g", "h", "i", "j", "k", "p", "q", "t", "x", "y", "2", "3", "4", "5", "8", ";", ":", "?", "!", "*", and "#".

19. A system for display of ink representing handwritten and hand printed characters on a display screen, the system comprising:

a screen that receives a sequence of one or more characters, entered by a user using a stylus to trace the sequence on the screen; and a computer that is programmed:

to determine if the sequence of one or more characters is part of a continuous cursive word;

when the sequence of one or more characters is part of a continuous cursive word, to determine if at least one character in the cursive word is a potential multi-stroke character;

when no character in the cursive word is a potential multi-stroke character, to display ink representing the cursive word until the stylus is lifted from the screen and for a selected single stroke time interval after the stylus is lifted from the screen;

when at least one character in the cursive word is a potential multi-stroke character, to display ink representing the cursive word until the stylus is lifted from the screen and for a selected multi-stroke time interval after the stylus is lifted from the screen; and when the stylus is reapplied to the screen in a correct position relative to at least one character in the cursive word during the multi-stroke time interval, to receive at least one stroke from the stylus and determining if the received stroke is a proper modifier stroke;

when the received stroke is a proper modifier stroke, to continue to display the cursive word and the at least one received stroke until the reapplied stylus is lifted from the screen and for a multi-stroke time interval after the reapplied stylus is lifted from the screen; and when the received stroke is not a proper modified stroke, to remove ink representing the character sequence from the screen and to continue to display the received stroke for at least the single stroke time interval after the reapplied stylus is lifted from the screen.

20. The system of claim 19, wherein said computer is further programmed so that:

when said sequence of one or more characters is not part of a continuous cursive word, to determine if at least one character said character sequence is a potential multi-stroke character;

when no character in said character sequence is a potential multi-stroke character, to display ink representing the one or more characters in said character sequence until said stylus is lifted from said screen and for said single stroke time interval after said stylus is lifted from said screen;

when at least one character in said character sequence is a potential multi-stroke character, to display ink representing the one or more characters in said character sequence until said stylus is lifted from said screen and for said multi-stroke time interval after said stylus is lifted from said screen; and when said stylus is reapplied to said screen in a correct position relative to at least one character in said character sequence during said multi-stroke time interval, to receive at least one stroke from said stylus and to display the one or more characters in said character sequence and the at least one received stroke until said reapplied stylus is lifted from said screen and for said multi-stroke time interval after said reapplied stylus is lifted from said screen.

21. The system of claim 19, wherein said computer is further programmed so that:

when said stylus is not reapplied to said screen in a correct position relative to at least one character in said cursive word during said multi-stroke time interval, to continue to display ink representing said cursive word until said stylus is lifted from said screen and for said single stroke time interval after said stylus is lifted from said screen.

22. The system of claim 19, wherein said computer is further programmed to choose said single stroke time interval length in a range 0–2 sec.

23. The system of claim 19, wherein said computer is further programmed to choose said multi-stroke time interval length in a range 0–2 sec.

24. The system of claim 19, wherein said computer is further programmed to choose said potential multi-stroke characters to include at least one character from a character set consisting of "b", "d", "f", "g", "h", "i", "j", "k", "p", "q", "t", "x", "y", "2", "3", "4", "5", "8", ";", ":", "?", "!", "*" and "#".

25. A method for display of ink representing handwritten and hand printed characters on a display screen, the method comprising:
- receiving a sequence of one or more characters, entered by a user using a stylus to trace the sequence on a screen;
- determining if the sequence of one or more characters is a single character;
- when the sequence of one or more characters is a single character, determining if the character is a potential multi-stroke character;
- when the character is not a potential multi-stroke character, displaying ink representing the character until the stylus is lifted from the screen and for a selected single stroke time interval after the stylus is lifted from the screen;
- when the character is a potential multi-stroke character, displaying ink representing the character until the stylus is lifted from the screen and for a selected multi-stroke time interval after the stylus is lifted from the screen; and
- when the stylus is reapplied to the screen in a correct position relative to the character during the multi-stroke time interval, receiving at least one stroke from the stylus and continuing to display the character and the at least one received stroke until the reapplied stylus is lifted from the screen and for a multi-stroke time interval after the reapplied stylus is lifted from the screen.

26. A method for display of ink representing handwritten and hand printed characters on a display screen, the method comprising:
- receiving a sequence of one or more characters, entered by a user using a stylus to trace the sequence on a screen;
- determining if the sequence of one or more characters is a single character;
- when the sequence of one or more characters is a single character, determining if the character is a potential multi-stroke character;
- when the character is not a potential multi-stroke character, displaying ink representing the character until the stylus is lifted from the screen and for a selected single stroke time interval after the stylus is lifted from the screen;
- when the character is a potential multi-stroke character, displaying ink representing the character until the stylus is lifted from the screen and for a selected multi-stroke time interval after the stylus is lifted from the screen;
- when the stylus is reapplied to the screen in a correct position relative to at least one character in the character during the multi-stroke time interval, receiving at least one stroke from the stylus and determining if the received stroke is a proper modifier stroke;
- when the received stroke is a proper modifier stroke, continuing to display the character and the at least one received stroke until the reapplied stylus is lifted from the screen and for a multi-stroke time interval after the reapplied stylus is lifted from the screen; and
- when the received stroke is not a proper modified stroke, removing ink representing the character sequence from the screen and continuing to display the received stroke for at least the single stroke time interval after the reapplied stylus is lifted from the screen.

27. A system for display of ink representing handwritten and hand printed characters on a display screen, the system comprising:
- a screen that receives a sequence of one or more characters, entered by a user using a stylus to trace the sequence on a screen; and
- a computer that is programmed:
- to determine if the sequence of one or more characters is a single character;
- when the sequence of one or more characters is a single character, to determine if the character is a potential multi-stroke character;
- when no character is a potential multi-stroke character, to display ink representing the character until the stylus is lifted from the screen and for a selected single stroke time interval after the stylus is lifted from the screen;
- when the character is a potential multi-stroke character, displaying ink representing the character until the stylus is lifted from the screen; and
- when the stylus is reapplied to the screen in a correct position relative to the character during the multi-stroke time interval, to receive at least one stroke from the stylus and to continue to display the character and the at least one received stroke until the reapplied stylus is lifted from the screen and for a multi-stroke time interval after the reapplied stylus is lifted from the screen.

28. A system for display of ink representing handwritten and hand printed characters on a display screen, the system comprising:
- a screen that receives a sequence of one or more characters, entered by a user using a stylus to trace the sequence on a screen; and
- a computer that is programmed:
- to determine if the sequence of one or more characters is a single character;
- when the sequence of one or more characters is a single character, to determine if the character is a potential multi-stroke character;
- when the character is not a potential multi-stroke character, to display ink representing the character until the stylus is lifted from the screen and for a selected single stroke time interval after the stylus is lifted from the screen;
- when the character is a potential multi-stroke character, to display ink representing the character until the stylus is lifted from the screen and for a selected multi-stroke time interval after the stylus is lifted from the screen;
- when the stylus is reapplied to the screen in a correct position relative to at least one character in the character during the multi-stroke time interval, to receive at least one stroke from the stylus and to determine if the received stroke is a proper modifier stroke;

when the received stroke is a proper modifier stroke, to continue to display the character and the at least one received stroke until the reapplied stylus is lifted from the screen and for a multi-stroke time interval after the reapplied stylus is lifted from the screen; and when the received stroke is not a proper modified stroke, to remove ink representing the character sequence from the screen and to continue to display the received stroke for at least the single stroke time interval after the reapplied stylus is lifted from the screen.

* * * * *